United States Patent
Lee et al.

(10) Patent No.: US 11,675,109 B2
(45) Date of Patent: Jun. 13, 2023

(54) DISPLAY DEVICE

(71) Applicant: SAMSUNG DISPLAY CO., LTD., Yongin-si (KR)

(72) Inventors: Duk Jin Lee, Suwon-si (KR); Beong-Hun Beon, Hwaseong-si (KR); Je Seon Yeon, Cheonan-si (KR); Min Ha Kim, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 420 days.

(21) Appl. No.: 16/879,943

(22) Filed: May 21, 2020

(65) Prior Publication Data
US 2021/0096278 A1    Apr. 1, 2021

(30) Foreign Application Priority Data
Sep. 30, 2019   (KR) .......................... 10-2019-0120591

(51) Int. Cl.
*G02B 1/115*    (2015.01)
*G06F 1/16*    (2006.01)

(52) U.S. Cl.
CPC ............ *G02B 1/115* (2013.01); *G06F 1/1626* (2013.01)

(58) Field of Classification Search
CPC ........... G02B 1/11–1/118; G02B 5/30–5/3075; G06F 1/00–1/3296; G02F 1/00–1/397
See application file for complete search history.

(56) References Cited

U.S. PATENT DOCUMENTS

| | | | |
|---|---|---|---|
| 2014/0225131 A1* | 8/2014 | Benson | G06F 1/1643 257/82 |
| 2014/0353626 A1* | 12/2014 | Shim | H01L 51/5265 359/601 |
| 2017/0068287 A1* | 3/2017 | Jung | G02B 1/111 |

FOREIGN PATENT DOCUMENTS

| | | | |
|---|---|---|---|
| JP | 2017194489 A | * 10/2017 | ............... G02B 1/10 |
| KR | 10-2015-0111871 | 10/2015 | |
| KR | 10-2016-0129819 | 11/2016 | |
| KR | 10-2017-0028349 | 3/2017 | |
| KR | 10-2016-0016904 | 2/2018 | |
| KR | 10-2019-0027773 | 3/2019 | |

OTHER PUBLICATIONS

Machine translation of JP2017194489. Retrieved Aug. 16, 2022.*

* cited by examiner

*Primary Examiner* — Prashant J Khatri
(74) *Attorney, Agent, or Firm* — F. Chau & Associates, LLC

(57) ABSTRACT

A display device includes a substrate, a circuit part disposed on the substrate and an encapsulation layer disposed on the circuit pan. An inorganic layer is disposed on the encapsulation layer and includes a groove. An anti-reflection layer is disposed on the inorganic layer. The anti-reflection layer includes a first region that overlaps the groove and a second region that is outside of the first region. The transmittance of the first region and the transmittance of the second region are different from each other.

20 Claims, 16 Drawing Sheets

DISPLAY DEVICE

CROSS-REFERENCE TO RELATED APPLICATION

This application claims priority under 35 U.S.C. § 119 to Korean Patent Application No. 10-2019-0120591, filed on Sep. 30, 2019 in the Korean Intellectual Property Office, the disclosure of which is incorporated by reference in its entirety herein.

TECHNICAL FIELD

The present disclosure relates to a display device.

DISCUSSION OF RELATED ART

Portable devices which include a display, such as mobile phones, portable multimedia players (PMPs), personal digital assistants (PDAs), laptop computers, and the like are often used in environmental conditions which include a large amount of external light. However, the visibility of an image that is generated by the display device is significantly diminished when external light is reflected or scattered on the display surface. Therefore, it is important to reduce the problems caused by the reflection and scattering of external light on the display surface.

Recently, various display devices having a camera function and the like in addition to displaying an image have been developed. Since an optical member such as a camera or an infrared sensor is disposed outside of a display area of the display device, the size of the display area of the display device is often reduced.

SUMMARY

The present inventive concepts have been made in an effort to provide a display device that prevents display quality from being degraded by reflection. In addition, the present inventive concepts have been made to provide a display device that includes a transmissive area surrounded by a display area.

An exemplary embodiment of the present inventive concepts includes a display device including a substrate, a circuit part disposed on the substrate and an encapsulation layer disposed on the circuit part. An inorganic layer is disposed on the encapsulation layer and includes a groove. An anti-reflection layer is disposed on the inorganic layer. The anti-reflection layer includes a first region that overlaps lire groove and a second region that is outside of the first region. The transmittance of the first region and the transmittance of the second region are different from each other.

An edge of the first region may be aligned with an outermost edge of the groove.

The inorganic layer may include a silicon oxynitride (SiON).

The groove may have a circular shape in a plan view.

The anti-reflection layer may include a first passivation layer, a second passivation layer overlapping the first passivation layer, and a first optical layer disposed between the first passivation layer and the second passivation layer.

The first optical layer may include polyvinyl alcohol.

Each of the first and second passivation layers may include at least one of triacetyl cellulose (TAC), polyethylene terephthalate (PET), a cycloolefin polymer (COP), and an acrylic polymer.

The anti-reflection layer may further include a second optical layer disposed between the inorganic layer and the first passivation layer.

The first optical layer may include $I_5^-$, $I_3^-$, and $I^-$ and a content of $I_5^-$ and $I_3^-$ included in the first region may be less than a content of $I_5^-$ and $I_3^-$ included in the second region.

The first region may be transparent.

Another exemplary embodiment includes a display device having a substrate, a circuit part disposed on the substrate and an encapsulation layer disposed on the circuit part. An inorganic layer is disposed on the encapsulation layer and includes a groove. The inorganic layer includes a silicon oxynitride (SiON). An anti-reflection layer is disposed on the inorganic layer and includes a first region overlapping the groove and a second region that is outside of the first region.

The substrate may include a through hole overlapping the first region.

An outermost edge of the groove may be disposed inward an edge of the first region.

The encapsulation layer may include a first layer disposed on the circuit part and a second layer disposed on the first layer, and the inorganic layer may be disposed on the second layer.

The display device may include a third layer disposed between the second layer and the inorganic layer.

The display device may include an adhesive layer disposed between the inorganic layer and the anti-reflection layer.

Transmittance of the first region may be higher than that of the second region.

Another exemplary embodiment includes a method for manufacturing a display device. The method includes forming a circuit part disposed on the substrate, the circuit part including a light emitting element. An encapsulation layer is formed on the circuit pan. An inorganic layer is formed on the encapsulation layer. The inorganic layer includes a silicon oxynitride (SiON) and a plurality of grooves. An anti-reflection layer is formed having a first optical layer including I5−, I3−, and I−. The inorganic layer is bonded to the anti-reflection layer by an aging treatment performed under high temperature and high humidity. The silicon oxynitride (SiON) of the plurality of grooves of the inorganic layer undergoes a reaction which releases an NHz gas due to the aging treatment. The NHz gas causes a discoloration of a first region of the first optical layer that overlaps the plurality of grooves.

According to exemplary embodiments of the present inventive concepts, it is possible to reduce reflectance of a display device through an anti-reflection layer, and to improve display quality. In addition, it is possible to improve display quality through a transmissive area provided in a display area. Further, it is possible to easily provide an anti-reflection layer disposed in a display area and including a transparent area through a simple process.

DETAILED DESCRIPTION OF TOE EXEMPLARY EMBODIMENTS

Figure 1:
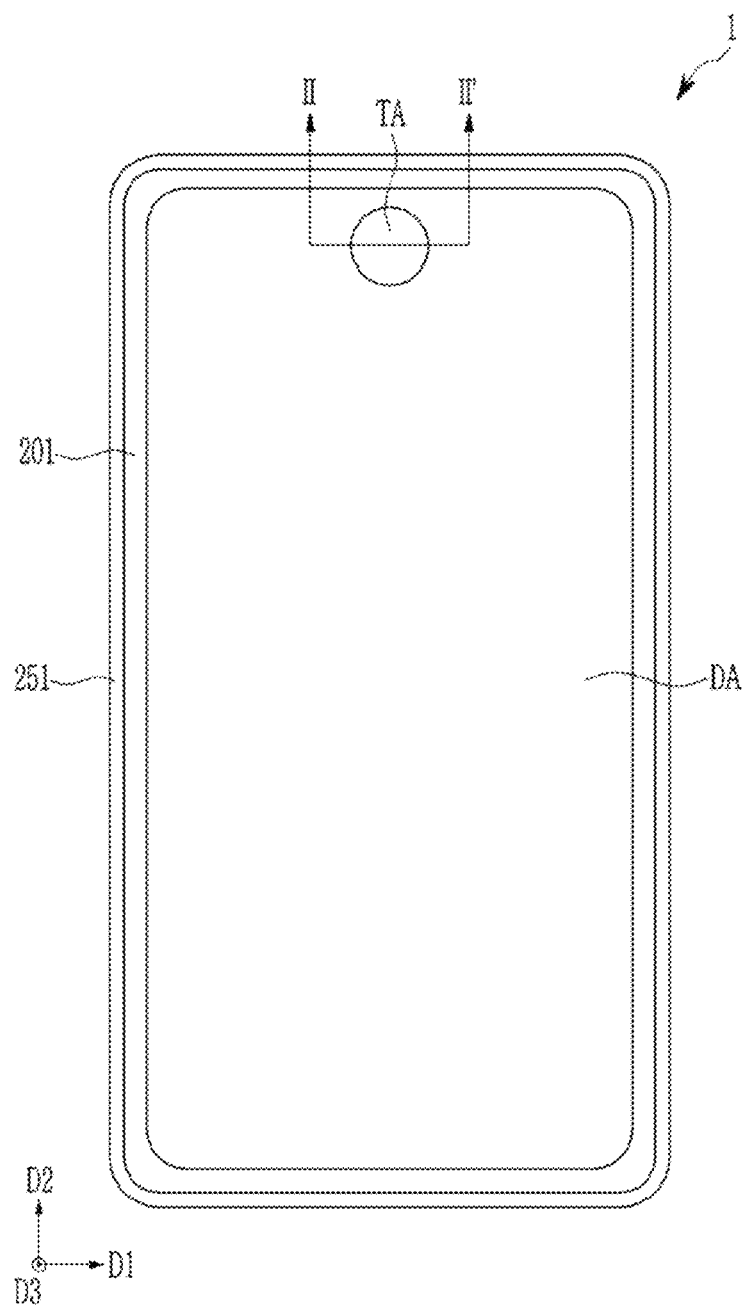
FIG. 1 illustrates a top plan view of a display device according to an exemplary embodiment of the present inventive concepts.

The present invention will be described more fully hereinafter with reference to the accompanying drawings, in which exemplary embodiments of the present inventive concepts are shown. As those skilled in the art would realize, the described exemplary embodiments may be modified in various different ways, all without departing from the spirit or scope of the present disclosure.

Parts that are irrelevant to the description will be omitted to clearly describe the present inventive concepts, and like reference numerals designate like elements throughout the specification.

Further, in the drawings, the size and thickness of each element are arbitrarily illustrated for ease of description, and the present inventive concepts are not limited to the exemplary embodiments illustrated in the drawings. In the drawings, the thicknesses of layers, films, panels, regions, etc., are exaggerated for clarity. In the drawings, for ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means disposed on or below the object portion, and does not necessarily mean disposed on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "in a plan view" means viewing a particular portion from the top, and the phrase "in a cross-sectional view" means viewing a cross-section formed by vertically cutting a particular portion from a side.

Figure 2:
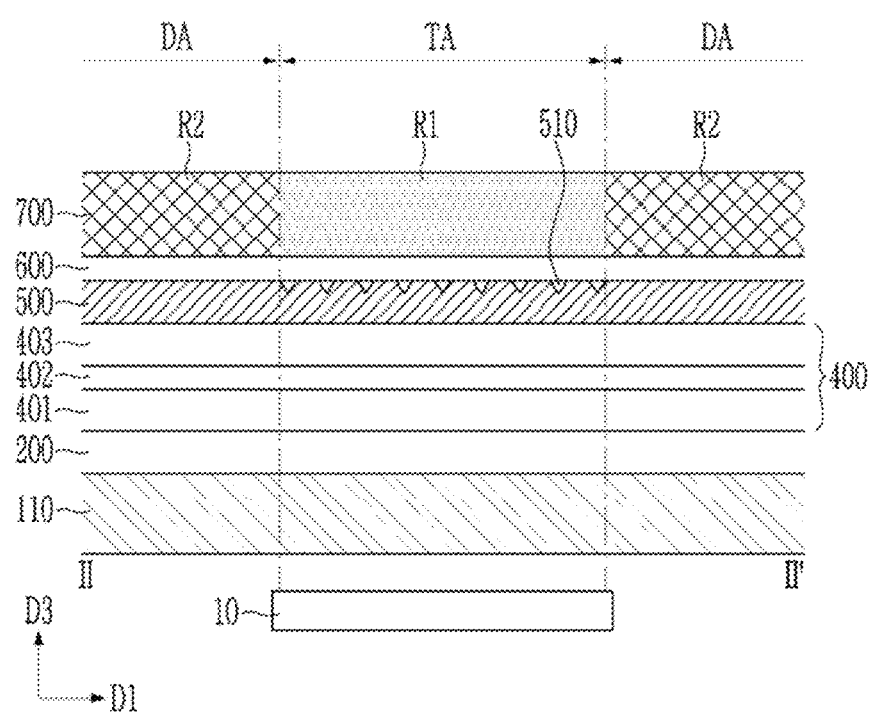
FIG. 2 illustrates a cross-sectional view taken along line II-II' of FIG. 1 according to an exemplary embodiment of the present inventive concepts.
Figure 3:
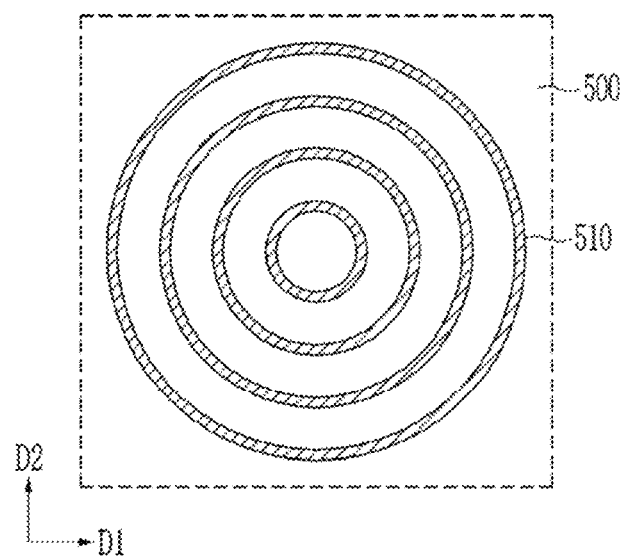
FIG. 3 illustrates a top plan view of an inorganic layer according to an exemplary embodiment of the present inventive concepts.
Figure 4:
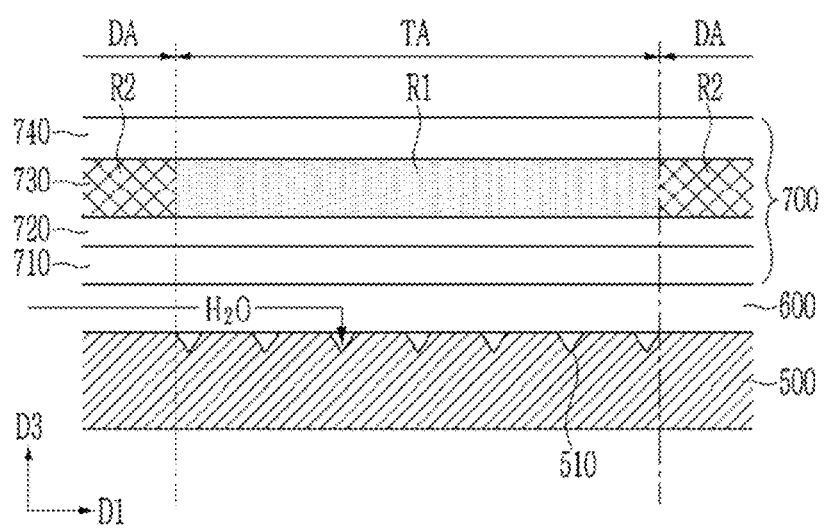
FIG. 4 illustrates a cross-sectional view of the inorganic layer, an adhesive layer, and an anti-reflection layer according to an exemplary embodiment of the present inventive concepts.
Figure 5:
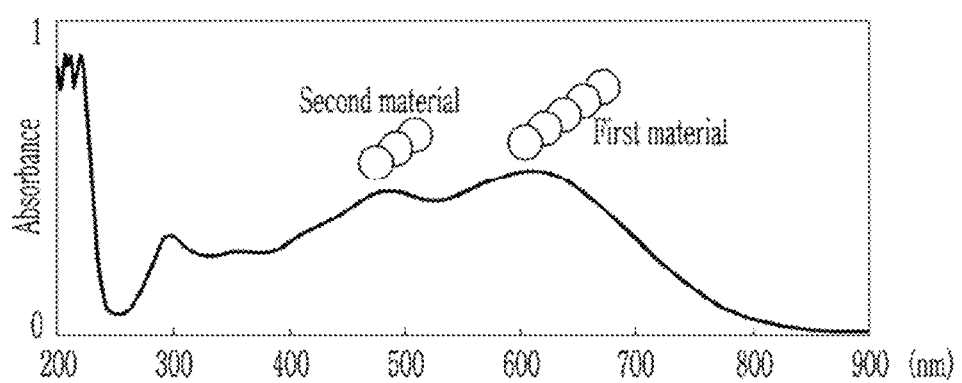
FIG. 5 illustrates a light absorbance graph according to an exemplary embodiment of the present inventive concepts.

Hereinafter, a display device according to exemplary embodiments of the present inventive concepts will be described with reference to FIG. 1 to FIG. 5. FIG. 1 illustrates a top plan view of a display device according to an exemplary embodiment. FIG. 2 illustrates a schematic cross-sectional view taken along line II-II' of FIG. 1 according to an exemplary embodiment. FIG. 3 illustrates a top plan view of an inorganic layer according to an exemplary embodiment. FIG. 4 illustrates a detailed cross-sectional view of the inorganic layer, an adhesive layer, and an anti-reflection layer. FIG. 5 illustrates a light absorbance graph for explaining a principle of discoloration of an anti-reflection layer according to an exemplary embodiment.

First, referring to FIG. 1, a display device 1 may include an external buffer area 201, an encapsulation junction area 251, a display area DA, and a transmissive area TA. For example, as shown in the exemplary embodiment of FIG. 1, the display area DA may have a rectangular shape having relatively longer sides extending in the second direction D2 and relatively shorter sides extending in the First direction D1. However, exemplary embodiments of the present inventive concepts are not limited thereto. For example, in other exemplary embodiments, the display area DA may have a variety of other shapes or orientations.

As shown in the exemplary embodiment of FIG. 1, the transmissive area TA may be surrounded by the display area DA. The external buffer area 201 may be disposed in the periphery of the display area DA (e.g., in the First direction D1 and or second direction D2). The encapsulation junction area 251 may be disposed in the periphery of the external buffer area 201 (e.g., in the first direction D1 and/or second direction D2) on the edges of the display device 1. However, exemplary embodiments of the present inventive concepts are not limited thereto and the arrangement of the display area DA, transmissive area TA, external buffer area 201 and encapsulation junction area 251 may vary in other exemplary embodiments.

The display area DA is an area in which a plurality of pixels are arranged to display an image. Each pixel may include at least one transistor and a light emitting element that emits light by receiving a current from the transistor.

The transmissive area TA has light transmittance that is relatively higher than the light transmittance of the display area DA or the light transmittance of the external butter area 201. The transmissive area TA does not include pixels disposed therein and images are not displayed in the transmissive area. Since light is transmitted in the transmissive area TA, when at least one optical member 10 (see FIG. 2) is disposed below the transmissive area TA (e.g., in the third direction D3), external light may be incident on the optical member 10 or emitted from it. In an exemplary embodiment, the optical member 10 may be a camera, a flash, a sensor, etc.

The transmissive area TA according to the exemplary embodiment of FIG. 1 may be disposed in the display area DA. In the exemplary embodiment shown in FIG. 1, the transmissive area TA is circular and is disposed near a top edge (e.g., in the second direction D2) of the display area DA. However, in other exemplary embodiments, the transmissive area TA may have a variety of different shapes and may be positioned in different portions of the display area DA. While the transmissive area TA does not include any pixels, the transmissive area TA may be surrounded (e.g., in the first direction D1 and/or second direction D2) by a plurality of pixels included in the display area DA.

Since a size of the transmissive area TA is larger than the size of one pixel, the transmissive area TA is different from a light-transmitting zone formed in the pixel to realize a transparent display. For example, a region in which a pixel circuit is formed in the pixel may have a rectangular shape of about 25 µm width (e.g., length in the first direction D1) and 50 µm height (e.g., length in the second direction D2) In contrast, the transmissive area TA may have a much larger circular structure having a diameter of about 3 mm or less. However, exemplary embodiments of the present inventive concepts are not limited thereto.

Hereinafter, a cross-sectional structure of the display device according to exemplary embodiments of the present inventive concepts will be described with reference to FIG. 2 to FIG. 4. FIG. 2 briefly illustrates a circuit pail 200 disposed on a substrate 110. A transistor and a light emitting element included in the circuit part 200 will be described in detail with reference to FIG. 12.

In the exemplary embodiment shown in FIG. 2, the display device 1 includes the substrate 110. The optical member 10 may be disposed below the substrate 110 along a third direction D3, and the optical member 10 may be a camera, a flash, a sensor, etc.

In an exemplary embodiment, the substrate 110 may include a plastic layer and a barrier layer or may include a glass substrate. The plastic layer and the barrier layer may be alternatively stacked.

In an exemplary embodiment, the plastic layer may include at least one compound selected from polyethersulfone (PES), polyacrylate (PAR), polyetherimide (PEI), polyethylene naphthalate (PEN), polyethylene terephthalate (PET), polyphenylene sulfide (PPS), polyarylate, polyimide (PI), polycarbonate (PC), poly(arylene ether sulfone) (PAES), and a combination thereof. The barrier layer may include at least one compound selected from a silicon oxide, a silicon nitride, and an aluminum oxide. However, exemplary embodiments of the present inventive concepts are not limited thereto. For example, the barrier layer may include any inorganic material.

The circuit part 200 includes a plurality of transistors and light emitting elements disposed on the substrate 110. As shown in the exemplary embodiment of FIG. 2, the circuit part 200 may be disposed directly on the substrate 110 (e.g., in the third direction D3).

An encapsulation layer 400 protecting the light emitting element is disposed on the circuit pan 200. For example, as shown in the exemplary embodiment of FIG. 2, the encapsulation layer 400 may be disposed directly on the circuit part 200 (e.g., in the third direction D3). In an exemplary embodiment, the encapsulation layer 400 may be a thin film encapsulation layer in which an organic film and an inorganic film are stacked. As shown in the exemplary embodiment of FIG. 2, the encapsulation layer 400 may include a first layer 401, a second layer 402, and a third layer 403. For example, the second layer 402 may be disposed directly on the first layer 401 (e.g., in the third direction D3) and the third layer 403 may be disposed directly on the second layer 402 (e.g., in the third direction D3). In an exemplary embodiment, the first layer 401 and the third layer 403 may each be an inorganic film and the second layer 402 may be an organic film. Alternatively, the first layer 401 and the third layer 403 may each be an organic film and the second layer 402 may be an inorganic film. However, exemplary embodiments of the present inventive concepts are not limited thereto.

Furthermore, the shape of the encapsulation layer 400 is not limited to the exemplary embodiment shown in FIG. 2, and the encapsulation layer 400 may have a variety of different shapes (e.g., to correspond to a shape of the substrate 110, etc.). In an exemplary embodiment, at least one capping layer and at least one functional layer may be disposed below the encapsulation layer 400 along the third direction D3.

An inorganic layer 500 is disposed on the encapsulation layer 400. For example, as shown in the exemplary embodiment of FIG. 2, the inorganic layer 500 may be disposed directly on the encapsulation layer 400 (e.g., in the third direction D3).

The inorganic layer 500 may include an inorganic material, and may include, for example, a silicon oxynitride (SiON). The inorganic layer 500 may be formed by various methods. For example, the inorganic layer 500 may be formed by using chemical vapor deposition (CVD), etc.

The inorganic layer 500 may include at least one groove 510 overlapping the transmissive area TA (e.g., in the third direction D3). Each groove 510 is recessed in an upper surface of the inorganic layer 500. As shown in the exemplary embodiment of FIG. 3, the groove 510 may have a circular shape in a plan view (e.g., when viewed in the third direction D3) and the inorganic layer 500 may include a plurality of concentric circular grooves. However, exemplary embodiments of the present inventive concepts are not limited thereto and each groove 510 may have various shapes.

An adhesive layer 600 is disposed on the inorganic layer 500. For example, as shown in the exemplary embodiment of FIG. 2, the adhesive layer 600 may be disposed directly on the inorganic layer 500 (e.g., in the third direction D3). In an exemplary embodiment, the adhesive layer 600 may include at least one of a resin, an optically clear adhesive (OCA), and a pressure sensitive adhesive (PSA).

An anti-reflection layer 700 is disposed on the adhesive layer 600. For example, as shown in the exemplary embodiment of FIG. 2, the anti-reflection layer 700 may be disposed directly on the adhesive layer 600 (e.g., in the third direction D3). The anti-reflection layer 700 may suppress the reflection of external light to improve the visibility of the images displayed on the display area DA of the display device 1 and to minimize loss of light emitted from the circuit part 200 to the outside.

The anti-reflection layer 700 overlaps the transmissive area TA and the display area DA (e.g., in the third direction D3). The anti-reflection layer 700 includes a first region R1 that overlaps the transmissive area TA (e.g., in the third direction D3) and a second region R2 that overlaps the display area DA (e.g., in the third direction D3) and does not overlap the transmissive area TA. The first region R1 may substantially overlap the at least one groove 510 of the inorganic layer 500 which overlaps the transmissive area TA. The second region R2 may not substantially overlap the at least one groove 510 of the inorganic layer 500 (e.g., in the third direction D3). The first region R1 substantially overlapping the groove 510 of the inorganic layer may also include a region that directly overlaps a region between a plurality of grooves 510 where the groove 510 is not specifically disposed, such as a region overlapping an inner side of an outermost groove of the plurality of grooves 510. As will be described in more detail in FIG. 7 herein, the first region R1 may also include regions overlapping the transmissive area TA that are adjacent to the regions of the first region R1 that directly overlap the grooves.

The transmittance of the first region R1 and the transmittance of the second region R2 may be different from each other. For example, the transmittance of the first region R1 may be higher than the transmittance of the second region R2 The transparency of the first region R1 may be higher than the transparency of the second region R2. For example, the first region R1 may be substantially transparent.

The anti-reflection layer 700 will be described in more detail with reference to FIG. 4.

As shown in the exemplary embodiment of FIG. 4, the anti-reflection layer 700 may include a first passivation layer 720, a second passivation layer 740 overlapping the first passivation layer 720, and a first optical layer 730 disposed between the first passivation layer 720 and the second passivation layer 740. For example, the first optical layer 730 may be disposed directly on the first passivation layer 720 (e.g., in the third direction D3). The second passivation layer 740 may be disposed directly on the first optical layer 730 (e.g., in the third direction D3). As shown in the exemplary embodiment of FIG. 4, the anti-reflection layer 700 may further include a second optical layer 710 disposed between the first passivation layer 720 and the adhesive layer 600. For example, the second optical layer 710 may be disposed directly on the adhesive layer 600 (e.g., in the third direction D3).

The first passivation layer 720 and the second passivation layer 740 may be disposed on one surface of the first optical layer 730, respectively, to protect and support the first optical layer 730.

In an exemplary embodiment, the first passivation layer 720 and the second passivation layer 740 may include a resin. For example, each of the first passivation layer 720 and the second passivation layer 740 may include at least one compound selected from triacetyl cellulose (TAC), polyethylene terephthalate (PET), a cycloolefin polymer (COP), and an acrylic polymer.

Each of the first passivation layer 720 and the second passivation layer 740 may additionally have properties such as anti-reflection, low reflection, anti-glare, or hard coating.

The first optical layer 730 is a layer for linearly polarizing light emitted from the circuit part 200. The first optical layer 730 has a polarization axis, and may linearly polarize light in a direction perpendicular to the polarization axis. For example, the first optical layer 730 may absorb light coinciding with the polarization axis and pass light perpendicular to the polarization axis. Therefore, the light emitted from the circuit pan 200 may pass through the first optical layer 730 and be linearly polarized in a direction perpendicular to the polarization axis of the first optical layer.

In an exemplary embodiment, the first optical layer 730 may include polyvinyl alcohol (PVA). For example, the first optical layer 730 may be formed by stretching a thin film including polyvinyl alcohol, which is a polymer material, and by adsorbing and orienting a pigment such as iodine therein. In an exemplary embodiment, the first optical layer 730 may include $I_5^-$, $I_3^-$, and $I^-$.

In a process of bonding the inorganic layer 500 and the anti-reflection layer 700 through the adhesive layer 600, an aging treatment is performed under high temperature and high humidity conditions. In an exemplary embodiment, the high temperature condition may be, for example, in a range of about 60° C. to about 80° C., and the high humidity condition may be, for example, in a range of about 60% to about 90%. In this exemplary embodiment, moisture ($H_2O$) such as water vapor, etc. is introduced through the adhesive layer 600 having high moisture permeability. The moisture ($H_2O$) may move along the adhesive layer 600 and flow into the groove 510 of the inorganic layer 500. A chemical reaction such as the following Equation 1 may occur in the groove 510 that has been subjected to the high temperature and high humidity conditions, and has a relatively loose atomic bonding structure.

$$SiON_x \rightarrow SiO_y + NH_z \qquad \text{<Equation 1>}$$

The gas $NH_z$ generated through Equation 1 flows into the anti-reflection layer 700, such as the first optical layer 730. For example, the gas $NH_z$ from the groove 510 may flow into the region of the first optical layer 730 which overlaps with the transmissive area TA. The gas $NH_z$ may react with $I_5^-$ and $I_3^-$ included in the first optical layer 730. The $NH_z$ that flows into the first optical layer 730 and the $I_5^-$, and $I_3^-$ of the first optical layer 730⁻ may cause a chemical reaction in the first optical layer as shown in Equation 2 below.

$$I_5^- (\text{or } I_3^- + I_2) + 2NH_4^+ \rightarrow 2I_2 + I^- + 2NH_3 + H_2 \qquad \text{<Equation 2>}$$

Referring to FIG. 5, $I_5^-$, which is a first material, may absorb light of a wavelength range of about 600 nanometers to about 700 nanometers, and $I_3^-$, which is a second material, may absorb light of a wavelength range of about 500 nanometers. The $I_5^-$ and $I_3^-$ of the first optical layer 730 in the first region R1 which absorb a predetermined wavelength of light are decomposed into $I^-$ through reaction with $NH_z$. $I^-$ has a low absorption of light and is substantially transmissive. Therefore, the first optical layer 730 in the first region R1 may be viewed as discolored. For example, the discolored first optical layer 730 in the first region R1 may be transparent. However, the gas $NH_z$, from the groove 510 does not substantially flow into the region of the first optical layer 730 corresponding to the second region R2 and thus does not decompose due to a reaction with the $NH_z$. Therefore, the transmittance of the second region R2 which includes the first optical layer 730 having a relatively larger amount of $I_5^-$ and $I_3^-$ than the first optical layer of the first region R1 may be lower than the transmittance of the first region R1.

A concentration of $I_5^-$ and $I_3^-$ included in the first region R1 may be less than the concentration of $I_5^-$ and $I_3^-$ included in the second region R2. In addition, a concentration of $I^-$ included in the first region R1 may be greater than that of $I^-$ included in the second region R2. In the first region R1, since absorption of light by $I_5^-$ and $I_3^-$ is reduced, transmittance of the light may be improved and the first region R1 may be transparent. The phenomenon of a region of the anti-reflection layer becoming transparent as the content of $I_5^-$ and $I_3$ decreases and the content off increases is referred to as decolorization.

The first region R1 may be decolorized by a predetermined gas so that the transmittance thereof may be high while the polarization degree thereof is low. The polarization degree of the first region R1 may be lower than the polarization degree of the second region R2.

In summary, the groove 510 of the inorganic layer 500 generates a material (e.g., $NH_z$ gas) that induces discoloration of a portion of the first optical layer 730. The corresponding material induces discoloration of a portion (e.g., the first region) of the first optical layer 730 overlapping the groove 510 so that a substantially transparent region overlaps the optical member 10 without a physical removal process of the anti-reflection layer.

In an exemplary embodiment, the second optical layer 710 may be a retardation layer. The second optical layer 710 may be a conventional layer used in an anti-reflection layer for a display device to provide a retardation function.

In an exemplary embodiment, the second optical layer 710 may include at least one compound selected from an acrylic-based film, a polycarbonate-based film, a polystyrene-based film, a polyimide-based film, a cellulose-based film, an olefin-based film, a cycloolefin polymer-based film, or a combination thereof. For example, the second optical layer 710 may include an acryl-based film, a polycarbonate-based film, or a cycloolefin polymer-based film.

Figure 6:
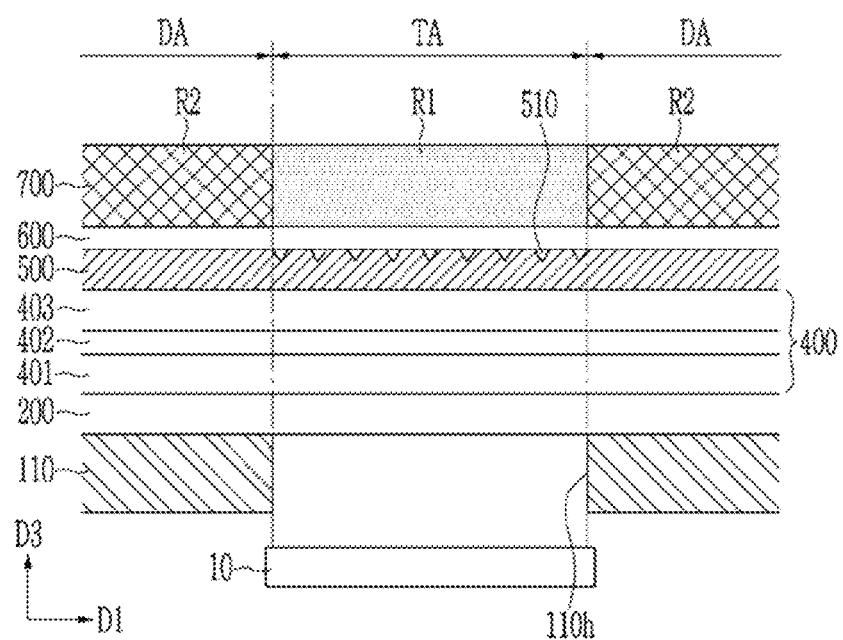
FIG. 6 illustrates a cross-sectional view of a display device according to an exemplary embodiment of the present inventive concepts.
Figure 7:
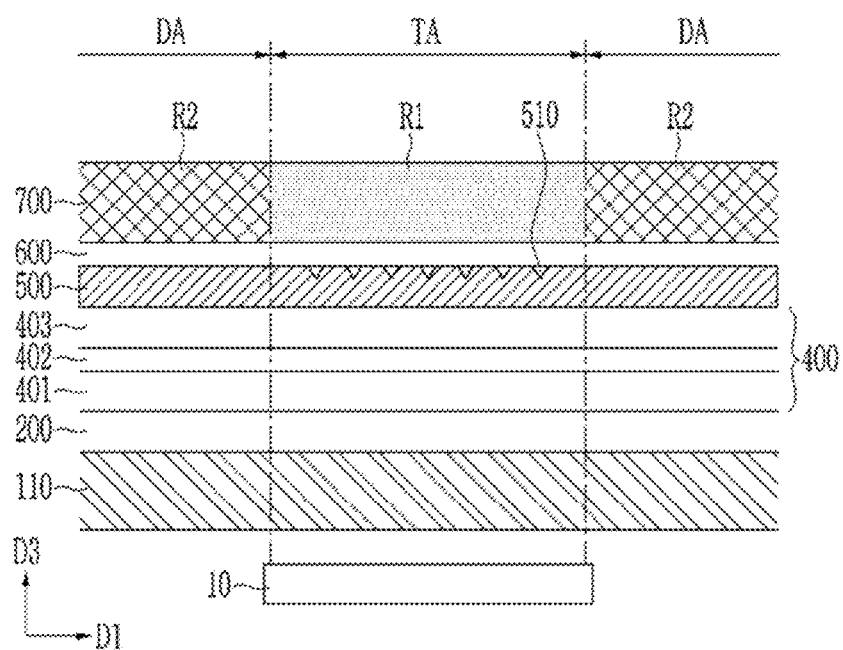
FIG. 7 illustrates a cross-sectional view of a display device according to an exemplary embodiment of the present inventive concepts.
Figure 8:
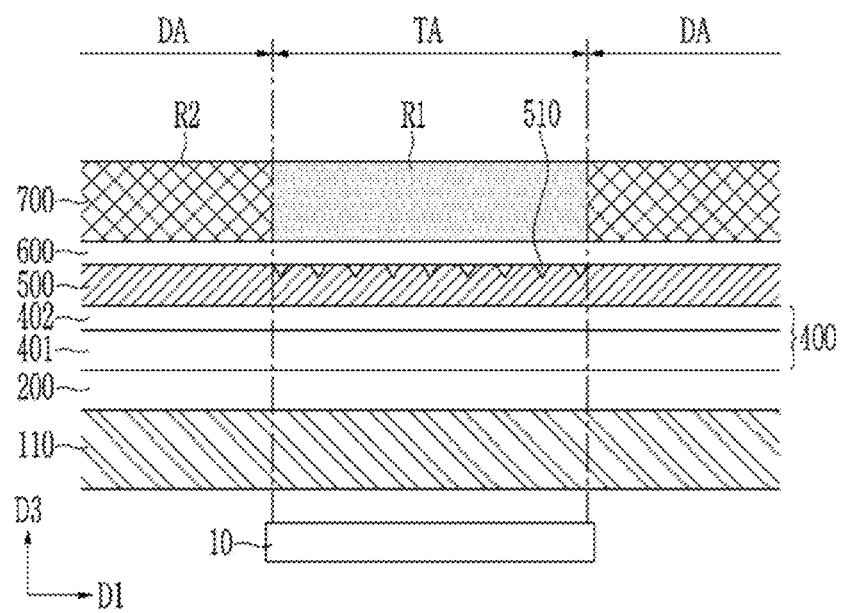
FIG. 8 illustrates a cross-sectional view of a display device according to an exemplary embodiment of the present inventive concepts.
Figure 9:
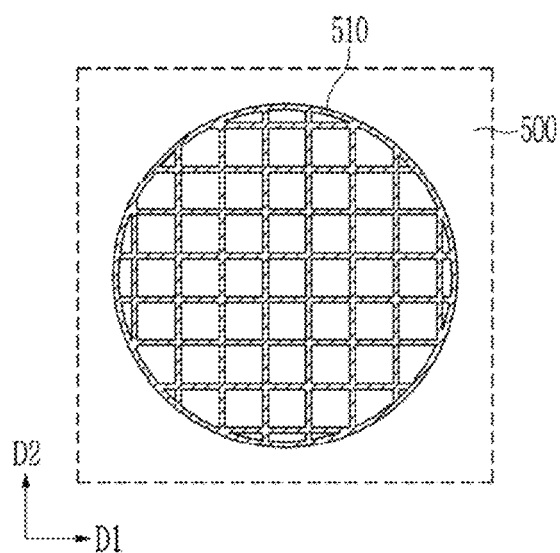
FIG. 9, FIG. 10, and FIG. 11 respectively illustrate top plan views of an inorganic layer according to exemplary embodiments of the present inventive concepts.
Figure 10:
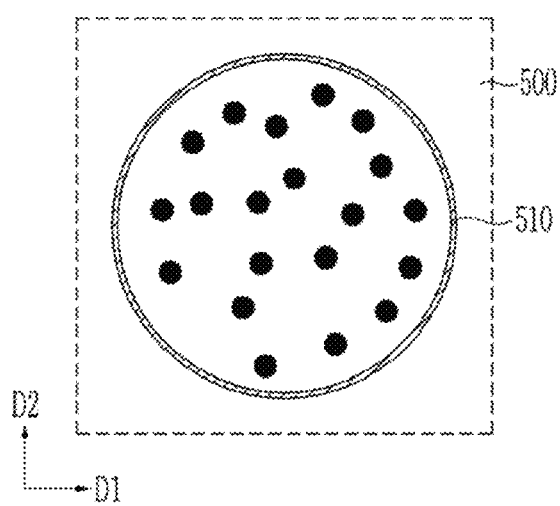
Figure 11:
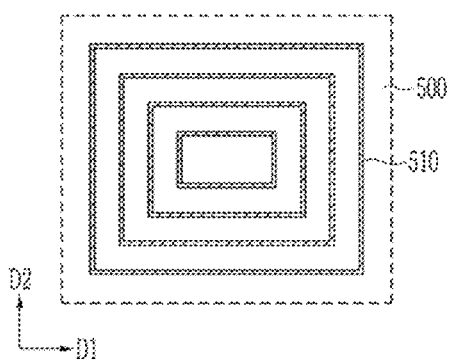

Hereinafter, a display device according to an exemplary embodiment will be described with reference to FIG. 6 to FIG. 11. FIG. 6 illustrates a schematic cross-sectional view of a display device according to an exemplary embodiment. FIG. 7 illustrates a schematic cross-sectional view of a display device according to an exemplary embodiment. FIG. 8 illustrates a schematic cross-sectional view of a display device according to an exemplary embodiment. FIG. 9, FIG. 10, and FIG. 11 respectively illustrate a top plan view of an inorganic layer according to exemplary embodiments. Descriptions of the same or similar components and contents as those described above with reference to FIG. 1 to FIG. 5 will be omitted.

As shown in the exemplary embodiment of FIG. 6, the substrate 110 may include a through hole 110h overlapping the transmissive area TA (e.g., in the third direction D3). The through hole 110h may be adjusted according to a size of the provided optical member 10 or a size of the transmissive area TA. For example, as shown in the exemplary embodiment of FIG. 6, the through hole 110h may have a width (e.g., length in the first direction D1) that is approximately the same as the width of the transmissive area TA.

The through hole 110h according to the exemplary embodiment of FIG. 6 may overlap the groove 510 formed in the inorganic layer 500 (e.g., in the third direction D3). In addition, the through hole 110h may overlap the first region R1 of the anti-reflection layer 700 (e.g., in the third direction D3).

As shown in the exemplary embodiment of FIG. 7, an outermost edge of the groove 510 (e.g., an outermost lateral edge in the first direction D1) formed in the inorganic layer 500 may be disposed inwardly of an edge of the transmissive area TA.

When the high temperature and high humidity conditions are provided during the manufacturing process thereof, decolorization (e.g., transparency) occurs in a portion of the anti-reflection layer 700 due to gas (e.g., $NH_2$) generated in the groove 510.

As the gas generated in the groove 510 is diffused, the decolorization may proceed in the anti-reflection layer 700 having a larger area compared to an area occupied by the groove 510. Accordingly, a planar area of the first region R1 (e.g., in the first direction D1 and/or second direction D2) may be larger than a planar area defined by outermost edges of the groove 510. For example, as shown in the exemplary embodiment of FIG. 7, the outermost lateral edges of the first region R1 of the anti-reflection layer extend past the outermost edges of the groove 510 (e.g., an area extending in the first direction D1 and/or second direction D2) and do not overlap the outermost edges of the groove in the third direction D3.

As shown in the exemplary embodiment of FIG. 8, the encapsulation layer 400 may include the first layer 401 and the second layer 402. The second layer 402 may be disposed directly on the first layer 401 (e.g., in the third direction D3). The first layer 401 may be disposed directly on the circuit part 200 (e.g., in the third direction D3). For example, the first layer 401 may be an organic layer and the second layer 402 may be an inorganic layer, or the first layer 401 may be an inorganic layer and the second layer 402 may be an organic layer. Unlike the exemplary embodiment shown in FIG. 2, the inorganic layer 500 may be disposed directly on the second layer 402 (e.g., in the third direction D3). The second layer 402 may directly contact the inorganic layer 500.

According to the exemplary embodiment of FIG. 8, the inorganic layer 500 may not only decolor a portion of the anti-reflection layer 700 by including the groove 510, but may also function as one layer of the encapsulation layer 400.

Next, referring to FIG. 9, FIG. 10, and FIG. 11, the inorganic layer 500 according to exemplary embodiments may include various types of grooves 510.

As shown in FIG. 9, the groove 510 may have outermost edges (e.g., lateral edges in the First direction D1 and/or second direction D2) overlapping the transmissive area TA, and may have a grid pattern located within the outermost edges. Alternatively, as shown in the exemplary embodiment of FIG. 10, the groove 510 may have outermost edges (e.g., lateral edges in the first direction D1 and/or second direction D2) overlapping the transmissive area TA and have a plurality of dot patterns located within the outermost edges. The plurality of dot patterns may be arranged in a predetermined geometric pattern or may be random. As a further alternative, as shown in FIG. 11, the groove 510 may have outermost edges (e.g., lateral edges in the first direction DI and/or second direction D2) overlapping the transmissive area and have a plurality of concentric rectangular patterns located within the outermost edge. However, in other exemplary embodiments the groove 510 may have various different shapes. For example, the groove 510 is not limited to planar shapes, and may have a variety of different shapes.

Figure 12:
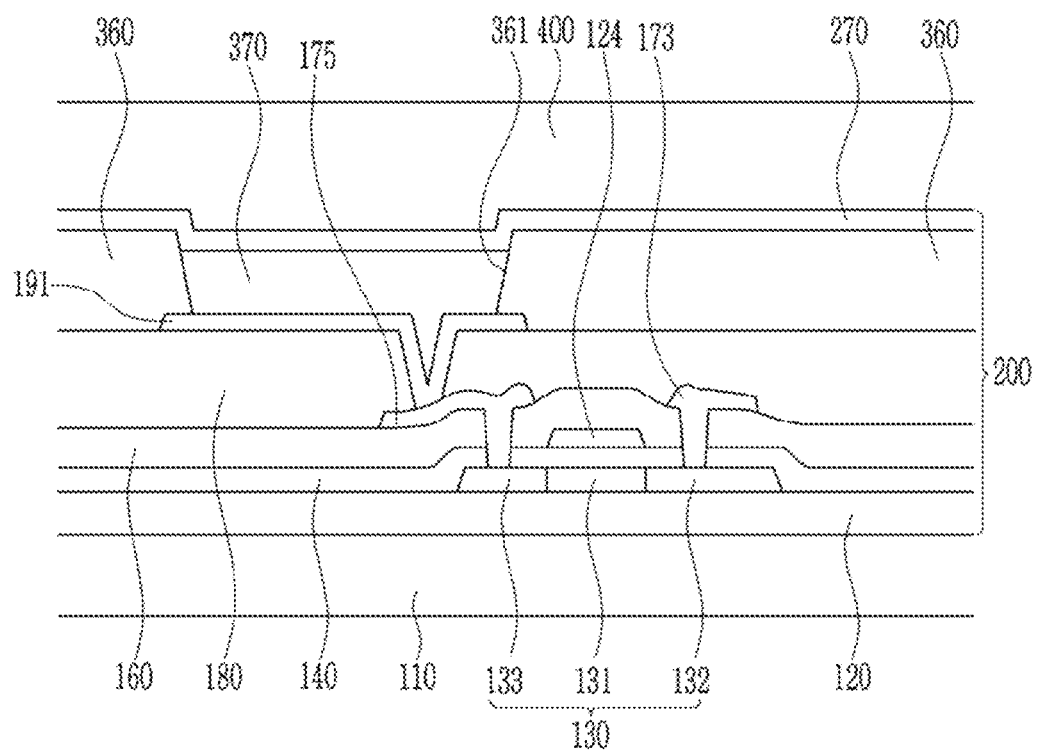
FIG. 12 illustrates a cross-sectional view of a circuit part according to an exemplary embodiment of the present inventive concepts.

Hereinafter, a circuit part of a display device according to an exemplary embodiment will be described with reference to FIG. 12. FIG. 12 illustrates a schematic cross-sectional view of a circuit part 200 according to an exemplary embodiment.

The circuit part 200 disposed on the substrate 110 includes a buffer layer 120. For example, the buffer layer 120 may be disposed directly on the substrate 110 (e.g., in the third direction D3). In an exemplary embodiment, the buffer layer 120 may include an inorganic insulating material such as at least one compound selected from silicon oxide, a silicon nitride, or an aluminum oxide, or may include an organic insulating material such as a polyimide acryl. In some exemplary embodiments, the buffer layer 120 may be omitted. The buffer layer 120 may planarize a surface of the substrate 110, or may prevent moisture, impurities, and the like from flowing into a light emitting layer 370.

A semiconductor layer 130 is disposed on the buffer layer 120. For example, as shown in the exemplary embodiment of FIG. 12, the semiconductor layer 130 may be disposed directly on the buffer layer 120 (e.g., in the third direction D3). In an exemplary embodiment, the semiconductor layer 130 may include at least one compound selected from an amorphous semiconductor, a polycrystalline semiconductor, or an oxide semiconductor.

The semiconductor layer 130 may include a source region 132 connected to a source electrode 173, a drain region 133 connected to a drain electrode 175, and a channel region 131 disposed between the source region 132 and the drain region 133 (e.g., in the first direction D1).

A gate insulating film 140 is disposed on the semiconductor layer 130 and portions of the buffer layer 120 that are not covered by the semiconductor layer 130. For example, as shown in the exemplary embodiment of FIG. 12, the gate insulating film 140 may be disposed directly on the semiconductor layer 130 and the portions of the buffer layer 120 not covered by the semiconductor layer (e.g., in the third direction D3). In an exemplary embodiment, the gate insulating film 140 may include an inorganic material, such as a silicon nitride or a silicon oxide, or may include an organic insulating material. The silicon nitride may include, for example, SiNx or SiON, and the silicon oxide may include, for example, $SiO_x$.

A gate electrode 124 may be disposed on the gate insulating film 140 that is disposed on the semiconductor layer 130. For example, as shown in the exemplary embodiment of FIG. 12, the gate electrode 124 may be disposed directly on the gate insulating film 140 (e.g., in the third direction D3). The gate electrode 124 may overlap the channel region 131 of the semiconductor layer 130 (e.g., in the third direction D3).

An interlayer insulating film 160 is disposed to cover the gate electrode 124 and the exposed gate insulating film 140. For example, as shown in the exemplary embodiment of FIG. 12, the interlayer insulating film 160 may be disposed directly on the gate electrode 124 and the exposed portion of the gate insulating film 140 that is not covered by the gate electrode 124. The interlayer insulating film 160 may include an inorganic insulating material or an organic insulating material.

The source electrode 173 and the drain electrode 175 may be disposed on the interlayer insulating film 160. For example, as shown in the exemplary embodiment of FIG. 12, the source electrode 173 and the drain electrode 175 may be disposed directly on the interlayer insulating film 160 (e.g., in the third direction D3). The source electrode 173 and the drain electrode 175 are respectively connected to the source region 132 and the drain region 133 of the semiconductor layer 130 through contact holes of the interlayer insulating film 160 and the gate insulating film 140.

A planarization insulating film 180 may be disposed on the source electrode 173, the drain electrode 175, and the interlayer insulating film 160 exposed therefrom. For example, as shown in the exemplary embodiment of FIG. 12, a planarization insulating film 180 may be disposed directly on the source electrode 173, the drain electrode 175 and the exposed portion of the interlayer insulating film 160 (e.g., in the third direction D3). The planarization insulating film 180 may include an inorganic insulating material or an organic insulating material.

A pixel electrode 191, which is a first electrode, is disposed on the planarization insulating film 180. For example, as shown in the exemplary embodiment of FIG. 12, the pixel electrode 191 may be disposed directly on the planarization insulating film 180 (e.g., in the third direction D3). The pixel electrode 191 may be connected to the drain electrode 175 through a contact hole of the planarization insulating film 180.

A partition wall 360 may be disposed on the pixel electrode 191 and the planarization insulating film 180. For example, as shown in the exemplary embodiment of FIG. 12, the partition wall 360 may be disposed directly on the pixel electrode 191 and the planarization insulating film 180 (e.g., in the third direction D3). The partition wall 360 may overlap at least a portion of the pixel electrode 191 (e.g., in the third direction D3). The partition wall 360 has an opening 361 overlapping the pixel electrode 191 (e.g., in the third direction D3). The light emitting layer 370 is disposed in the opening 361. A common electrode 270 is disposed on the light emitting layer 370 and the partition wall 360. For example, as shown in the exemplary embodiment of FIG. 12, the common electrode 270 may be disposed directly on the light emitting layer 370 and the partition wall 360 (e.g., in the third direction D3). In an exemplary embodiment, the common electrode 270 may extend (e.g., in the first direction D1) throughout a plurality of pixels. The encapsulation layer 400 described above is disposed on the common electrode 270. For example, as shown in the exemplary embodiment of FIG. 12, the encapsulation layer may be disposed directly on the common electrode 270 (e.g., in the third direction D3). The pixel electrode 191, the light emitting layer 370, and the common electrode 270 form a light emitting diode.

In some exemplary embodiments, the pixel electrode may be an anode which is a hole injection electrode, and the common electrode may be a cathode which is an electron injection electrode. In contrast, the pixel electrode may be a cathode, and the common electrode may be an anode. When holes and electrons are injected into the light emitting layer from the pixel electrode and the common electrode, respectively, light is emitted when the excitons in which the injected holes and electrons are combined enter a ground state from an excited state.

Figure 13:
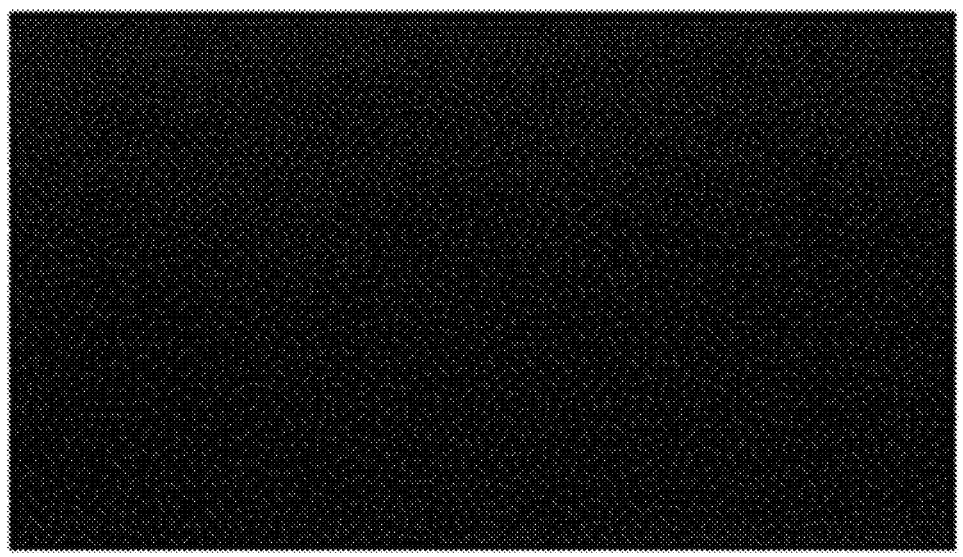
FIG. 13 and FIG. 14 respectively illustrate an image of an anti-reflection layer according to exemplary embodiments of the present inventive concepts.
Figure 14:
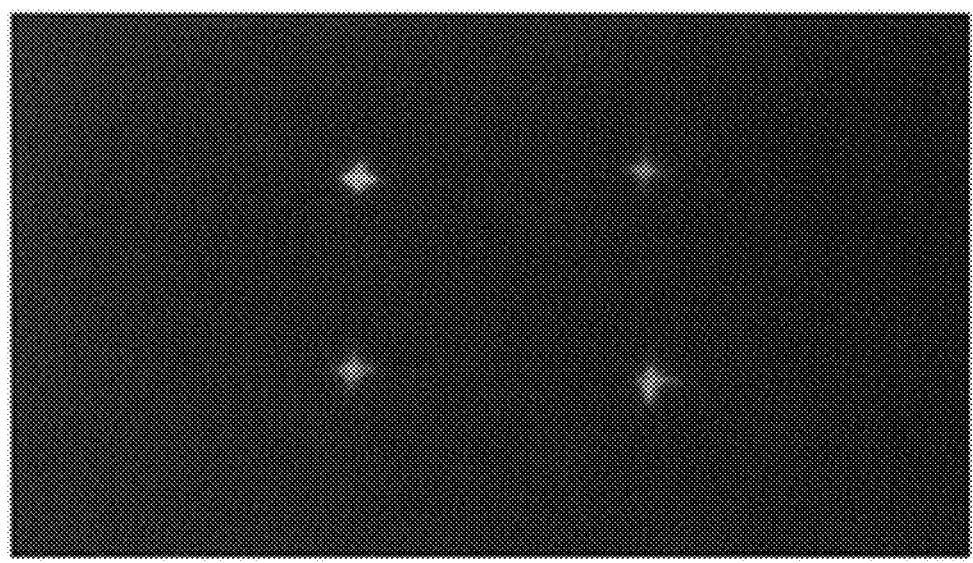
Figure 15:
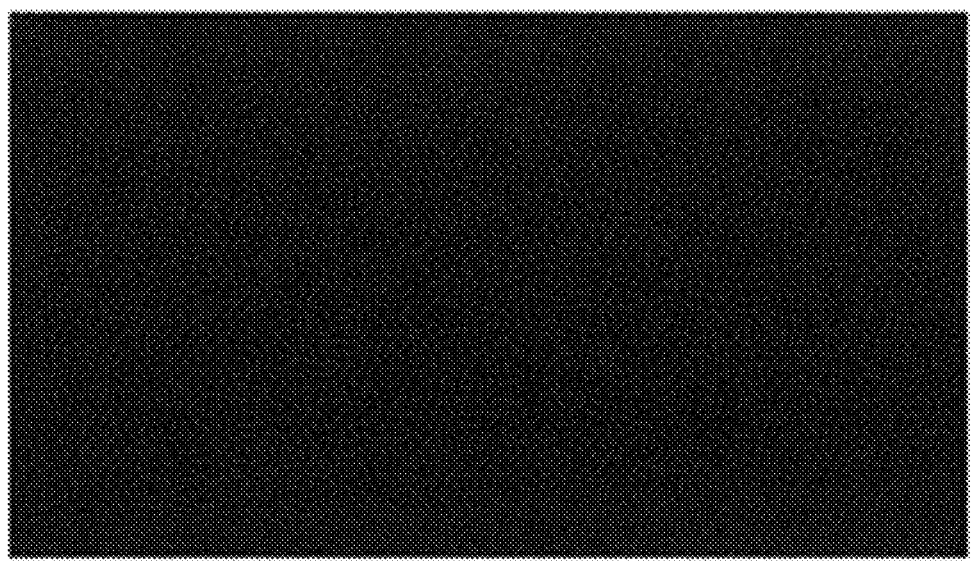
FIG. 15 and FIG. 16 respectively illustrate an image of an anti-reflection layer according to a comparative example.
Figure 16:
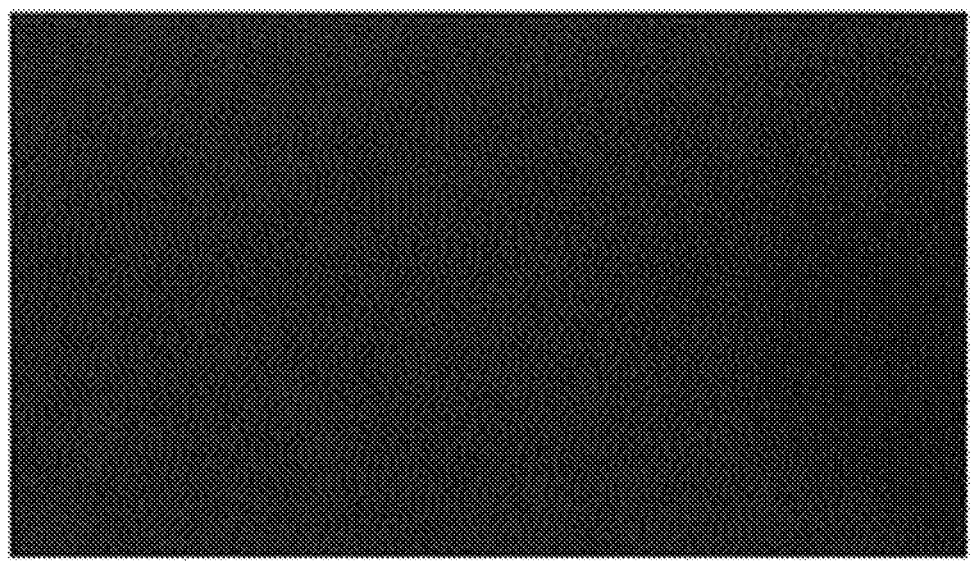

Hereinafter, images of an anti-reflection layer according to an exemplary embodiment and a comparative example will be described with reference to FIG. 13 to FIG. 16. FIG. 13 and FIG. 14 respectively illustrate an image of an anti-reflection layer according to an exemplary embodiment of the present inventive concepts. FIG. 15 and FIG. 16 respectively illustrate an image of an anti-reflection layer according to a comparative example.

First, after forming an inorganic layer of a silicon oxynitride (SiON) on a glass, a plurality of grooves having a cross shape are formed. Then, an anti-reflection layer is attached on the inorganic layer and subjected to an aging process for 24 hours at 65° C. and 90% humidity.

FIG. 13 is an image of the anti-reflection layer of an initial state according to the above-described process. FIG. 14 is an image of the anti-reflection layer after 24 hours elapse. As shown in the image of FIG. 14, discoloration was induced in the anti-reflection layer by the groove of the cross shape included in the inorganic layer in response to the high-temperature and high-humidity conditions of the aging treatment.

In the comparative example, after forming an inorganic layer of a silicon nitride ($SiN_x$), the above-described process is performed under the above-described conditions and then examined after 24 hours have elapsed to determine whether the anti-reflection layer was discolored. FIG. 15 is an image of the anti-reflection layer of an initial state according to the comparative example, and FIG. 16 is an image of the anti-reflection layer according to the comparative example after 24 hours elapse.

Referring to FIG. 15 and FIG. 16, it was confirmed that a separate decolorization process does not occur according to the pattern included in the inorganic layer even after 24 hours of the process elapsed.

In display devices in which the transmissive area is surrounded by the display area, the anti-reflection layer overlapping the transmissive area should be removed or provided transparently. However, a region in which the anti-reflection layer is removed may form an air gap, and light refraction may occur between the air gap and a window. Alternatively, an adhesive layer is required to bond the anti-reflection layer and the window, and when a portion of the anti-reflection layer is removed, the adhesive layer may have a curved shape in the removed region which causes unintended light refraction. In embodiments in which the anti-reflection layer is partially removed, a deterioration of the display quality may occur due to unintended light refraction. Additionally, the removal process may cause defects such as cracks, etc.

However, in exemplary embodiments of the present inventive concepts in which the inorganic layer includes a groove while including a silicon oxynitride material, discoloration may occur in a portion of the anti-reflection layer overlapping the groove. Accordingly, the anti-reflection layer including the transparent area in the display area may be easily provided without the anti-reflection layer removing process, thereby providing a display device having an improved display quality.

While this invention has been described in connection with exemplary embodiments, it is to be understood that the present inventive concepts are not limited to the disclosed exemplary embodiments, but, on the contrary, is intended to cover various modifications and equivalent arrangements.

What is claimed is:

1. A display device comprising:
a substrate;
a circuit part disposed on the substrate;
an encapsulation layer disposed on the circuit part;
an inorganic layer disposed on the encapsulation layer and including a groove; and
an anti-reflection layer disposed on the inorganic layer, the anti-reflection layer including a first region that overlaps the groove and a second region that is outside of the first region,
wherein a transmittance of light in a range of about 500 nm to about 700 nm of the first region and a transmittance of light in a range of about 500 nm to about 700 nm of the second region are different from each other.

2. The display device of claim 1, wherein an outermost edge of the first region is aligned with an outermost edge of the groove.

3. The display device of claim 1, wherein the inorganic layer includes a silicon oxynitride (SiON).

4. The display device of claim 1, wherein the groove has a circular shape in a plan view.

5. The display device of claim 1, wherein the anti-reflection layer further includes:
a first passivation layer;
a second passivation layer overlapping the first passivation layer; and
a first optical layer disposed between the first passivation layer and the second passivation layer.

6. The display device of claim 5, wherein the first optical layer includes polyvinyl alcohol.

7. The display device of claim 5, wherein each of the first and second passivation layers includes at least one compound selected from triacetyl cellulose (TAC), polyethylene terephthalate (PET), a cycloolefin polymer (COP), and an acrylic polymer.

8. The display device of claim 5, wherein the anti-reflection layer further includes a second optical layer disposed between the inorganic layer and the first passivation layer.

9. The display device of claim 5, wherein:
the first optical layer includes $I_5^-$, $I_3^-$, and $I^-$; and
a concentration of $I_5^-$ and $I_3^-$ included in the first region is less than a concentration of $I_5^-$ and $I_3^-$ included in the second region.

10. The display device of claim 1, wherein the first region is transparent.

11. A display device comprising:
a substrate;
a circuit part disposed on the substrate;
an encapsulation layer disposed on the circuit part;
an inorganic layer disposed on the encapsulation layer and including a groove, the inorganic layer including a silicon oxynitride (SiON); and
an anti-reflection layer disposed on the inorganic layer, the anti-reflection layer including a first region that overlaps the groove and a second region that is outside of the first region.

12. The display device of claim 11, wherein the substrate includes a through hole overlapping the first region.

13. The display device of claim 11, wherein:
the first region includes a region that is immediately adjacent to a region that directly overlaps the groove; and
an outermost edge of the groove is disposed inwardly of an edge of the first region.

14. The display device of claim 11, wherein the encapsulation layer includes:
a first layer disposed on the circuit part; and
a second layer disposed on the first layer,
wherein the inorganic layer is disposed on the second layer.

15. The display device of claim 13, wherein the encapsulation layer includes:
a first layer disposed on the circuit part;
a second layer disposed on the first layer; and
a third layer disposed on the second layer,
wherein the inorganic layer is disposed on the third layer.

16. The display device of claim 11, wherein the display device further includes an adhesive layer disposed between the inorganic layer and the anti-reflection layer.

17. The display device of claim 11, wherein a transmittance of light in a range of about 500 nm to about 700 nm of the first region is higher than a transmittance of light in a range of about 500 nm to about 700 nm of the second region.

18. The display device of claim 11, wherein the anti-reflection layer includes:
a first passivation layer;
a second passivation layer overlapping the first passivation layer; and
a first optical layer disposed between the first passivation layer and the second passivation layer.

19. The display device of claim 18, wherein the first optical layer includes polyvinyl alcohol.

20. The display device of claim 18, wherein:
the first optical layer includes $I_5^-$, $I_3^-$, and $I^-$; and
a concentration of $I_5^-$ and $I_3^-$ included in the first region is less than a concentration of $I_5^-$ and $I_3^-$ included in the second region.

* * * * *